May 25, 1965   D. H. GLASSON ETAL   3,185,839
APPARATUS FOR STERILISING LIQUIDS

Filed July 10, 1963   3 Sheets-Sheet 1

INVENTORS
DOUGLAS H. GLASSON
HAROLD C. BOURNE
By Emory L. Groff Jr. Atty

May 25, 1965

D. H. GLASSON ETAL 3,185,839

APPARATUS FOR STERILISING LIQUIDS

Filed July 10, 1963

INVENTORS
DOUGLAS H. GLASSON
HAROLD C. BOURNE
By Emery L. Groff Jr. Atty

May 25, 1965  D. H. GLASSON ETAL  3,185,839
APPARATUS FOR STERILISING LIQUIDS
Filed July 10, 1963  3 Sheets-Sheet 3

INVENTORS
DOUGLAS H. GLASSON
HAROLD C. BOURNE
By Emery L. Groff Jr.
Atty

United States Patent Office 3,185,839
Patented May 25, 1965

3,185,839
APPARATUS FOR STERILISING LIQUIDS
Douglas Haigh Glasson, Turramurra, and Harold Charles Bourne, Kogarah, New South Wales, Australia, assignors to Aquatron Corporation (Australia) Pty. Limited, Marrickville, New South Wales, Australia, a company of Australia
Filed July 10, 1963, Ser. No. 294,091
Claims priority, application Australia, July 12, 1962, 19,903/62
4 Claims. (Cl. 250—43)

This invention relates to apparatus for sterilising liquids, for example water, with ultra-violet rays. In the following description of the invention the term water shall be deemed to embrace any liquid which can be sterilised in the same manner as water as described herein.

It is known to use ultra-violet ray tubes (lamps) in apparatus for sterilising water but in such apparatus as constructed hitherto it was difficult to achieve optimum continuous sterilisation because inter alia—
  (a) The tube(s) was immersed in the water;
  (b) The short distance the ultra-violet rays will penetrate water;
  (c) The necessity to create a designed turbulence in the water in order to obtain an effective penetration.

These difficulties are overcome by the present invention and all water flowing through the apparatus and the apparatus in contact with the water are effectively sterilised.

The apparatus for sterilizing water according to this invention comprises an ultra-violet ray tube(s) supported in juxtaposition to a water trough to irradiate water therein, means to ignite said ultra-violet ray tube(s), means to cause water to flow along the trough to an outlet, and means to maintain water in said trough at a depth which is no greater than the depth at which the ultra-violet rays can irradiate the water.

One advantage resulting from the invention is that the ultra-violet tube(s) is not immersed in the water and consequently is not coated with solids or slime or the like contained in the water.

Another advantage resulting from the invention is that the ultra-violet ray tube(s) is not subjected to water temperature and can at all times be operated at its designed operating temperature which results in a more effective sterilisation than was possible by the means used hitherto.

A further advantage resulting from the invention is that solids or slimes contained in the water settle on the trough and the trough is removable for cleaning purposes, without dismantling other equipment in the apparatus.

One embodiment of the invention is now described with reference to the annexed drawings wherein.

Figure 1:
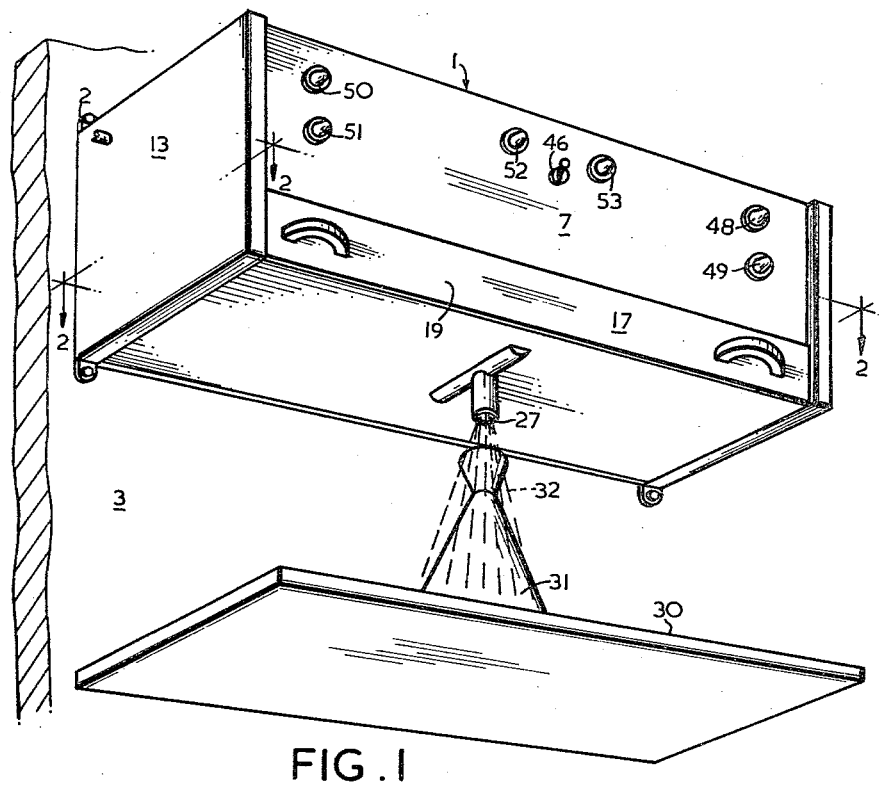
FIGURE 1 is a perspective view of the sterilising apparatus from below and mounted on a support and showing a sterilised water outlet to a receiving vessel.
Figure 2:
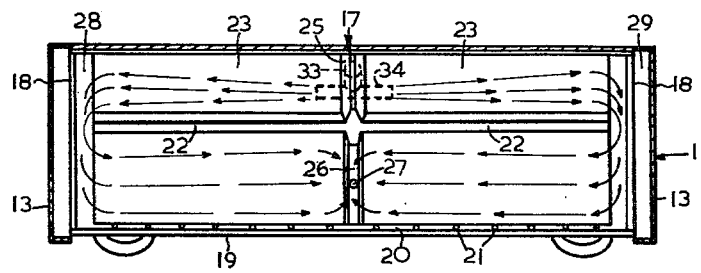
FIGURE 2 is a plan on plane 2—2 of FIGURE 1 showing the direction of flow of water in the trough.
Figure 3:
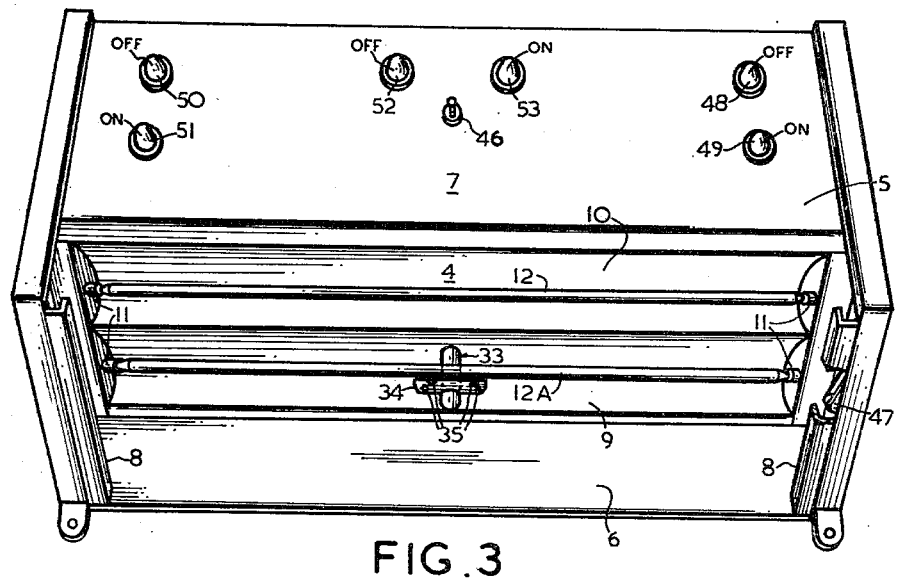
FIGURE 3 is a perspective view of the sterilising apparatus from below without the trough.
Figure 4:
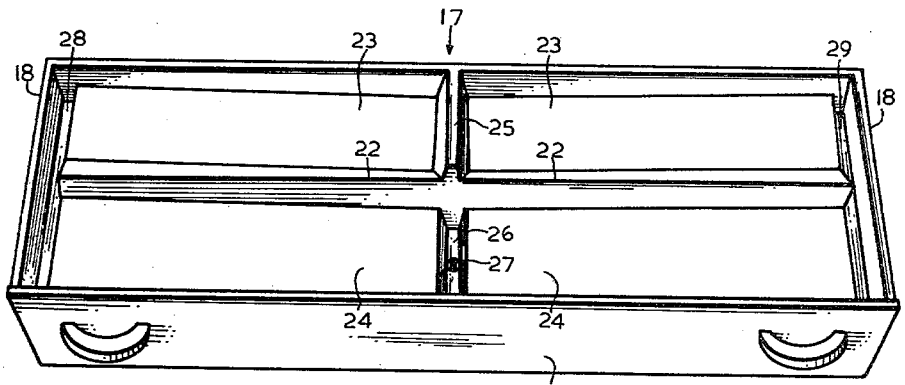
FIGURE 4 is a perspective view of the trough.
Figure 5:
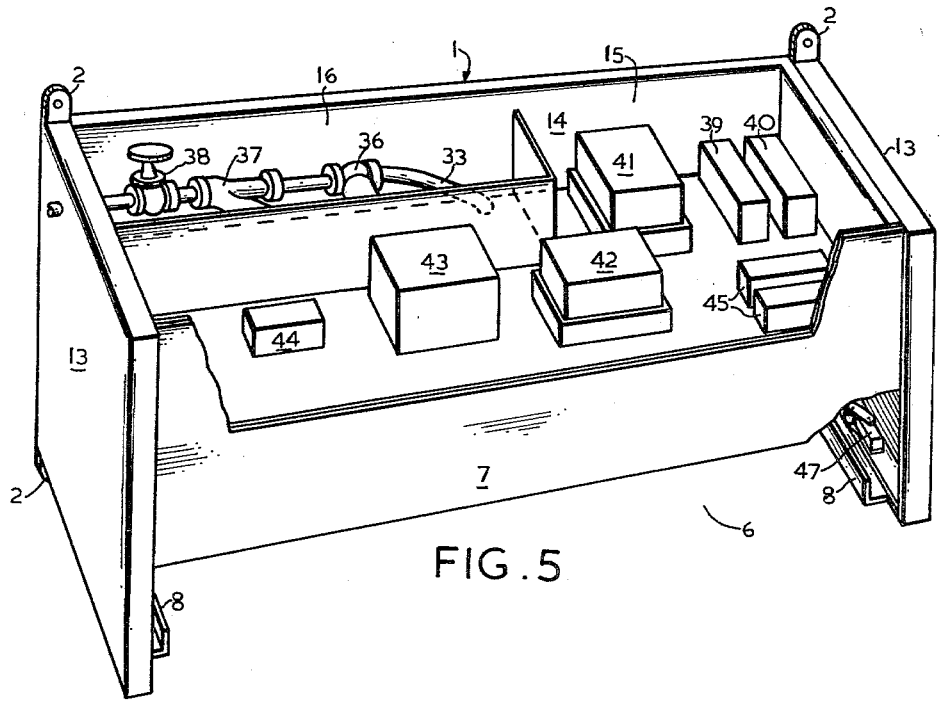
FIGURE 5 is a perspective view of the sterilising apparatus from the top with part of the front cut away showing the actuating means.

Referring to FIGURES 1 to 5 a rectangular casing 1 is provided with brackets 2 whereby it is fixed to a wall or other support as indicated at 3. The casing is divided by division plate 4 into an upper compartment 5 and a lower compartment 6. The bottom of the front wall 7 of the casing terminates at the plate 4. Water tray guides 8 are fixed to the ends of the casing. The division plate 4 is shaped and made to provide two longitudinal concave reflectors 9 and 10 and terminal holders 11 for ultra-violet ray tubes 12 and 12A are mounted in the ends 13 of the casing. The holders 11 are so positioned that the tubes 12 and 12A are located medially in the concavities of the reflectors. A tray 14 divided into compartments 15 and 16 for the electrical equipment and water supply control means respectively is constructed to fit in the casing 1 above the reflector-division plate 4.

The water trough is made in the form of a tray 17, the end edges 18 being adapted to slide in the guides 8. The tray and the casing are so constructed that any condensate forming on the casing will not flow into the tray. The top of the tray front 19 has a drip groove 20 therein and the drain holes 21 therefrom pass through the tray front. These parts are so arranged to prevent condensate flowing into the sterilising area. The bottom of the tray is divided by a longitudinal inverted V rib 22 into flat bottom troughs 23 and 24. The sides of the troughs slope inwardly. The trough 23 is divided medially by a transverse inverted V rib 25 and the trough 24 has a medial sterilised water outlet channel 26 with its bottom tapering to an outlet pipe 27. Water transfer channels 28 and 29 are formed at each end of the troughs 23 and 24. The floor of trough 23 slopes upwardly from the rib 25 to the respective channels 28 and 29 and the floor of trough 24 slopes upwardly from the respective channels 28 and 29 to the outlet channel 26. The gradient of the floors of the troughs 23–24 is determined by the degree of sterilisation and the volume of sterilised water required.

The ultra-violet ray tubes 12 and 12A of known sterilising capacity, are located centrally longitudinally over the troughs 23–24 respectively and with the reflectors 9–10 are located to radiate and reflect ultra-violet rays over the entire surface area of the troughs 23–24 and the outlet pipe 27; that is to say there are no shadow formations in the sterilising area even with but one ultra-violet tube in operation. A stand 30 is provided to support a vessel such as 31 to receive sterilised water flowing through the outlet pipe 27 and these parts are so arranged that the mouth of the vessel at least is subjected to the ultra-violet rays as indicated by the dotted lines 32. A funnel of ultra-violet transparent material may be fitted in the outlet pipe 27 to eliminate "water creep" to blind parts of the outlet pipe. Additionally or alternatively the reflectors 9–10 may be projected to reflect ultra-violet rays over the filling position.

A water supply pipe 33 passes through reflector 9 from compartment 16 in juxtaposition to the rough 23. A branch pipe 34 on the pipe 33 has outlets 35 located to discharge water into the trough 23 on each side of the rib 25. In the compartment 16 the pipe 33 is connected to a solenoid actuated control valve 36 and on the supply side of the valve 36 there is a strainer 37 and a shut down and regulating valve 38.

In the compartment 15 there are ballasts 39–40, relays 41–42, a suppressor 44 and power factor correction capacitors 45 for the ultra-violet ray tubes 12–12A. These components, the solenoid actuated valve 36 and a timing switch 43 are controlled by a master switch 46 and a micro switch 47. The micro switch 47 is moved to the "on" position by the tray 17 when the tray is moved into operative position in the casing 1. It moves to "off" position when the tray is withdrawn. The timing switch 43 ensures that the ultra-violet ray tubes 12–12A are switched on prior to the opening of the solenoid actuated valve 36 as will be described later, so that they can reach operating temperature and resterilise any water remaining in the trough prior to adding a further supply thereto. Indicator lamps 49–51 glow when the tubes 12–12A are functioning and indicator lamps 48–50 glow when the tubes are not functioning. Lamp 52 glows when the valve 36 is closed and lamp 53 glows when the valve is open.

Figure 6:
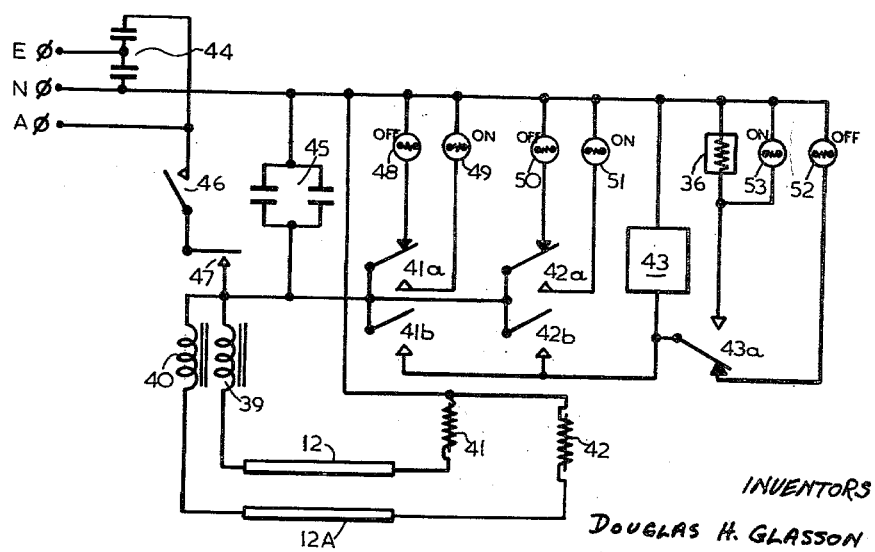
FIGURE 6 is a circuit diagram of the electrical apparatus.

The electrical circuits of the unit are here described in connection with FIGURE 6. Power from the main supply is connected to the terminals A, N and E. A noise suppressor 44 is connected across the terminals. Furthermore power factor correction capacitors are connected across the active lead (A) and the neutral lead (N). The active lead from terminal A is connected over a main switch 46 and a microswitch 47 with the two ballast chokes 39 and 40. The microswitch 47 is operated by inserting the tray as mentioned above to ensure that no power can be switched on unless the tray is in position. The chokes 39 and 40 are connected with the tubes 12 and 12A respectively which in turn are connected in series with two current sensitive relays 41 and 42. When the switches 46 and 47 are closed current flows from terminal A through the chokes 39 and 40, the tubes 12 and 12A and the relays 41 and 42 to terminal N, thus igniting the tubes and operating the relays. Each relay has a change-over contact 41a and 42a respectively, which are used to indicate whether the tubes are ignited. In the rest position each contact 41a and 42a closes a circuit for off-lamps 48 and 50, while in the operated position the on-lamps 49 and 51 will light up, to indicate that current is flowing through the tubes 12 and 12A and the relays 41 and 42.

The relays 41 and 42 have each a further make-contact 41b and 42b, which are connected in parallel and, when the relays are operated extend the active lead from microswitch 47 to a timing switch 43.

The timing switch 43 of known structure can be set to a predetermined time delay, for example 15 seconds, and thereafter will operate its changeover contact 43a. In one form the timing switch is motor-driven and operates a cam against a spring. The cam operates the changeover contact after the set time delay and is held in this position as long as a current flows through the motor. When the current is switched off, the cam returns to its initial position under spring tension. It must be understood that any other time delay switch which provides an initial time delay in operation can be used for the same purpose.

The contact 43a of the timing switch 43 connects the active lead in its rest position to an off-lamp 52 and in its operated position to an on-lamp 53 in parallel to the solenoid of the solenoid actuated valve 36 for the water supply referred to above.

Thus when the main switch 46 and the micro-switch 47 are closed, the tubes 12 and 12A with their relays 41 and 42 are energised and after a predetermined time delay the water supply is opened by the solenoid actuated valve 36, the condition of these units being indicated by the various off- and on-lamps 48 to 53.

In operation water flows, as a turbulent flow, in the directions of the arrows (FIGURE 2), the rate being regulated by the valve 38, preferably to maintain a flow of water over the high edges of the floors of the troughs 23-24 at a depth created by friction and gradient surface tension. The tray 17 (troughs 23-24) is made of a material which will also reflect the ultra-violet rays passing through the water thus concentrating the action of the ultra-violet rays throughout the sterilising zone of the apparatus.

It is to be understood that the invention is not limited to the apparatus as described and illustrated. Once the advantages of directing the ultra-violet rays on to a shallow flowing stream of water where the ray remitting medium is not in contact with the water is appreciated, many variations of the means to achieve the result described could be developed by those skilled in the art to which the invention appertains.

We claim:
1. Apparatus for sterilizing liquids comprising a rectangular casing divided into an upper and a lower compartment by a division plate having its bottom face formed as a reflecting surface, a plurality of ultra-violet ray tubes mounted below said division plate and connected to electrical equipment in the upper compartment; a water tray mounted in said lower compartment, the bottom of said water tray being divided by a longitudinal inverted V rib into two flat bottom troughs, one said trough being divided medially by a transverse inverted V rib, said other trough having medially therein a water outlet channel tapering to an outlet pipe; the floor of said transverse ribbed trough being shaped upwardly from said transverse rib to channels formed at each end of said tray and the floor of the other trough being sloped upwardly from said end channels to said water outlet channel, a water supply pipe having outlets to the trough divided by the transverse rib on each side of said rib, and means to regulate the rate of flow of water over the high edges of the floors of the troughs.

2. Apparatus for sterilizing liquids according to claim 1 wherein the division plate is shaped to provide two longitudinal concave section reflectors and an ultra-violet ray tube is mounted in each concavity.

3. Apparatus for sterilizing liquids according to claim 1 wherein the flow of water over the high edges of the floors of the troughs is maintained at a depth created by fraction and gradient surface tension.

4. Apparatus for sterilizing liquids comprising a rectangular casing divided into an upper end a lower compartment by a division plate having its bottom face formed as a reflecting surface, a plurality of ultra-violet ray tubes mounted below said division plate and connected to electrical equipment in the upper compartment; a water tray mounted in said lower compartment, the bottom of said water tray being divided by a longitudinal inverted V rib into two flat bottom troughs; one said trough being divided medially by a transverse inverted V rib and the other trough having medially therein a water outlet channel tapering to an outlet pipe, the floor of said transverse ribbed trough being sloped upwardly from said transverse rib to channels formed at each end of said tray and the floor of the other trough being sloped upwardly from said end channels to the said medial water outlet channel, a water supply pipe having outlets to the trough divided by the transverse rib on each side of said rib, said pipe projecting below the adjacent ultra-violet ray tube and means to regulate the rate of flow over the high edges of the floors of the troughs at a depth created by friction and gradient surface tension.

References Cited by the Examiner
UNITED STATES PATENTS

| | | | |
|---|---|---|---|
| 2,504,349 | 4/50 | Prieto | 250—48 |
| 2,667,584 | 1/54 | Rhodes | 250—45 |
| 2,740,049 | 3/56 | Stein | 250—48 X |
| 3,079,498 | 2/63 | Ruffin | 250—48 X |

RALPH G. NILSON, *Primary Examiner.*